3,127,382
VINYLBENZYL MONOEPOXIDE ETHER
Wendell N. De Lano, Freeland, Mich., assignor to The Dow Chemical Company, Midland, Mich., a corporation of Delaware
No Drawing. Filed Dec. 20, 1961, Ser. No. 160,950
13 Claims. (Cl. 260—88.3)

This invention relates to a new ethylenically unsaturated aromatic monoepoxide monomer useful for making polymer resins and to the cured resin made therefrom.

The monomer of the invention is useful for subsequent polymerization to produce either a homopolymer or copolymer when polymerized with other ethylenically unsaturated monomers. Such homopolymers and copolymers may be thermoplastic or thermosetting dependent upon whether or not a cross-linking agent is present or subsequently admixed therewith. The polymers so made are wear- and corrosion-resistant, form tenaceous bonds with surfaces in contact therewith during cure, and accordingly, are useful as surface coatings, impregnants, encapsulants, and laminants. The polymers so made may also be cast or molded and, when cured, possess high tensile strength and good electrical resistance, and, accordingly, are useful for making plastic-embedded electrical parts and cast and molded articles in general.

The compound of the invention, which may subsequently be converted to the durable resin of the invention above described, has the formula set out below;

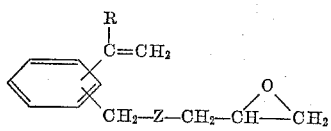

wherein R is hydrogen or an alkyl radical of from 1 to 4 carbon atoms and Z is selected from the class consisting of O and S. The compound is hereinafter usually referred to as either vinylbenzylglycidyl ether or vinylbenzylglycidyl thioether, dependent upon the identification of Z. More specifically, the compound is 1,2-epoxy-3-(ar-vinylbenzyloxy) propane when Z is O and 1,2-epoxy-3-(ar-vinylbenzylthio) propane when Z is S.

The ether or thioether of the invention may be prepared by reacting either vinylbenzyl alcohol or vinylbenzyl mercaptan with a molar excess of an epihalohydrin in the presence of an aqueous NaOH solution in an amount sufficient to provide about two moles of NaOH per mole of the alcohol or mercaptan. Between about 0.1 and 1.0% by weight of the vinylbenzyl alcohol or mercaptan, of an inhibitor, e.g., tertiary-butylcatechol, is usually employed. The temperature of the reaction is controlled between about 25° and about 60° C. for a period of between about 2 and about 6 hours during which an oil layer containing the monoether or monothioether is formed. The monoether is then fractionated to obtain the monoether which may contain up to about 20% by weight of unreacted vinylbenzyl alcohol or mercaptan. The product so made can then be further purified to 98 to 99 percent purity by vacuum distillation or by vapor phase chromatography. The latter consists chiefly of passing the product to be purified, suspended in a heated inert gas, e.g., helium, through a relatively small diameter vessel or conduit which is packed with a particulate mineral substance previously treated with a liquid having a high boiling point. The mineral substance commonly employed is a pulverized calcined fire brick, one of which is known as chromasorb, treated with polyglycol, e.g., polypropylene of a molecular weight of about 4000. A separation of materials passing therethrough, having but a very small difference in boiling points, may be accomplished thereby. Details of chromatographic separation may be found in Gas Chromatography by A. I. M. Keulemans (edited by C. G. Verve), published by Reinhold Publishing Co., N.Y. (1959).

The position of the vinyl group is dependent on its position on the benzene ring of the alcohol or mercaptan employed, i.e., there is no detectable shifting of the position from that of the starting alcohol or mercaptan and that of the ether or thioether produced. The position of the vinyl group on the beginning alcohol or mercaptan can be controlled by known methods during its separation.

Methods of preparing the vinylbenzyl alcohol or the vinylbenzyl mercaptan employed in the preparation of the monoether of the invention are well known.

Vinylbenzyl alcohol may be prepared by reacting vinylbenzyl chloride in the presence of NaOH added as an aqueous solution and an inhibitor, e.g., dinitro-orthocresol, at between about 50° C. and about 95° C. until the reaction is substantially complete, cooling the reaction mixture (whereby an oily layer containing the vinylbenzyl alcohol and an aqueous layer containing NaCl solution are formed), and separating the layers so formed. Other methods include the use of sodium carbonate instead of NaOH.

Vinylbenzyl mercaptan may be prepared by hydrolyzing S-vinylbenzylisothiuronium chloride in an aqueous NaOH solution, employing sodium nitrite as a water-phase inhibitor, and trinitrobenzene and/or methylaniline as an oil-phase inhibitor, at between about 40° C. and about 60° C., cooling, and allowing the reaction mixture to stratify into an oil phase and an aqueous phase, and separating the phases.

The monomer of the invention has especial significance because it possesses both a vinyl group adjacent to a conjugated hydrocarbon system and a terminal oxirane group, each of which constitutes reactive sites for individually controlled reactions with functional groups to form polymers which may be cured to make the polymeric compositions of the invention having various applications, as suggested above. The novel monomer of the invention is adapted to four alternative procedures to produce hard useful resins therefrom.

One procedure consists of admixing with the ether or thioether of the invention a free radical-promoting catalyst, e.g., benzoyl peroxide or azobisisobutyronitrile, and heating to between about 60° and 110° C. to effect homopolymerization between the vinyl groups and thereafter admixing therewith a curing agent to effect reaction between the oxirane groups.

A second procedure consists of admixing with the ether or thioether of the invention another ethylenically unsaturated monomer, e.g., styrene, vinyl toluene, acrylonitrile, acrylic acid, a lower-alkyl substituted acrylic acid, or a lower alkyl ester of acrylic acid or of a lower alkyl substituted acrylic acid (e.g., methyl methacrylate) and a free radical-promoting catalyst and heating to between about 60° and 110° C. to form a linear copolymer and thereafter reacting the copolymer so formed with a compound reactive with the oxirane groups to form a cross-linked copolymer. It will be recognized that the rate of copolymerization between the vinyl groups (in the ether or thioether and the other monomer) is dependent to a large extent on the catalyst and the second ethylenic monomer employed. Some of these polymerizable mixes are satisfactory at room temperature and others require advanced temperatures; some are satisfactory upon the application of heat only without need for a chemical free radical-promoting catalyst; other mixes are more satisfactory when catalyzed by ultra-violet light or by high velocity electrons rather than by a chemical catalyst whereas a combination of photo, thermal, high velocity electron, and chemical free radical-promoting catalysis produces the most satisfactory vinyl polymerization. The relative amounts of the ether or thioether of the invention and the other unsaturated monomer may be widely varied (as from no second or other monomer, as above, when the homopolymer is produced) to a pronounced preponderance of the second monomer; a weight proportion of from about 5 to 95 parts of the vinylbenzylglycidyl ether or thioether of the invention and correspondingly between 95 and 5 parts of the other ethylenically unsaturated monomer is preferred. Several different ethylenically unsaturated monomers may be employed with the ether or thioether of the invention, e.g., a composition containing styrene, methacrylic acid, acrylic acid and various esters of such acids.

A third alternative procedure is first to react the monoglycidyl ether or thioether of the invention with a compound which effects linkage through the oxirane groups either by chemically reacting with the oxirane groups, or by catalyzing the reaction thereof with each other, to form, in either instance, a linear polymer and thereafter reacting the polymer so made with an ethylenically unsaturated monomer of the type listed above. The first heating step, i.e., the one above mentioned as following the addition of the oxirane curing agent, may be omitted and the ethylenically unsaturated monomer admixed relatively soon following the oxirane curing agent, and the cross-linking reaction thereby effected by a single heating step at that time. It is preferable in practicing this mode of procedure to dissolve the linear polymer formed through the oxirane groups in a suitable solvent, e.g., toluene. The preferred oxirane linking agent to employ is a primary amine or phenol, diphenol, or polyphenol in the presence of a small amount of a tertiary amine. Since the composition of the invention being cured contains but one oxirane group per molecule, the polymer formed at this stage is thermoplastic even though polyfunctional curing agents are employed.

The fourth alternative procedure is to react the compound of the invention with a reactant containing two functional groups, one of which is reactive with the vinyl group and a second of which is reactive with the oxirane group of the compound, at between about room temperature and 200° C., to form a cross-linked polymer in a single stage reaction. It is recommended that the bifunctional reactant be added slowly at below about 100° C. and in an amount insufficient to provide enough for complete cure until the reaction mixture is ready for transfer to molds, whereupon the balance (a total amount of which provides substantially the stoichiometric quantity thereof for reaction with both the vinyl and oxirane groups of the ether or thioether and the composition then poured into molds, and placed in an oven at from about 100° to 200° C. for from about 1 to several hours. Illustrative of a reactant having both a functional vinyl group and a group which effects cure through the oxirane groups is maleic anhydride, the anhydride ring opening to provide sites for reaction with the oxirane groups, and the ethylenic bond thereof providing sites for reaction with the vinyl groups of the vinylbenzyl ether or thioether of the invention.

The following examples are illustrative of the practice of the invention.

*Example 1*

A 500-milliliter flask equipped with a condenser, stirrer thermal well, dropping funnel, and bottom drain was charged at 25° C. with the following ingredients:

67 g. of the mixed ortho and para isomers of vinylbenzyl alcohol,
185 g. of epichlorohydrin,
0.07 g. of tertiary-butyl catechol.

40 grams of a 50% by weight aqueous solution of NaOH were then fed by way of the dropping funnel into a flask over a period of 15 minutes, accompanied by stirring. During this time the temperature rose to 34° C. The content of the flask was stirred an additional hour and 45 minutes. It was then drawn out into a separatory funnel where it formed into an oil phase and an aqueous phase. The phases were then separated. The oil phase was vacuum distilled. It had a boiling point of 100° C. at an absolute pressure of 0.4 millimeter of Hg. It was examined by infra-red and mass spectroscopy techniques and showed itself to be over 80% by weight vinylbenzylglycidyl ether. The product was then further examined by the nuclear magnetic resonance test, as defined in Nuclear Magnetic Resonance Spectroscopy by L. M. Jackman, Pergamon Press, New York (1959). The magnetic resonance test showed the presence of the glycidyl group, the methylene group of the benzyl radical, and nuclear-attached vinyl group, together with some residual hydroxyl groups remaining from unreacted alcohol. It showed that the product was largely a mixture of the ortho and para isomers of vinylbenzylglycidyl ether. Analysis for the oxirane groups showed the ether to be 83% to 84% pure product.

A sample of the monomer of the invention so made was then subjected to chromatographic separation as above described and subsequently evaluated by infra-red, mass spectroscopy, and magnetic resonance. Infra red and mass spectroscopy showed the product to be about 99% mixed isomers of vinylbenzylglycidyl ether. Magnetic resonance showed it to be 46.02% of the para isomer, 51.4% of the ortho isomer, and 1.6% other than vinylbenzylglycidyl ether, giving a percent purity of 97.4%. Chemical analysis of the thus purified product as obtained is set out below together with the calculated or theoretical analysis:

|  | Actual analysis percent | Calculated theoretical analysis, percent |
|---|---|---|
| Carbon | 75.634 | 75.760 |
| Hydrogen | 7.483 | 7.418 |
| Oxygen | 16.883 | 16.822 |
|  | 100.000 | 100.000 |

The very close values obtained for the composition of the actual analysis and the theoretical analysis corroborate the high purity of the product shown by the other tests. The ratio of the density of the purified product at 25° C. to water at 4° C. was 1.0580. The refractive index of the mixed isomer at 25° C. was 1.5440. To illustrate the difference in refractive index of isomers of vinylbenzylglycidyl ether, an isolated sample of the para isomer gave a refractive index value of 1.5449.

*Example 2*

2 milliliters of the unpurified vinylbenzylglycidyl ether prepared according to the procedure of Example 1, 10 milliliters of styrene, and about 0.2 milliliter of benzoylperoxide (as a catalyst), were admixed and heated to 100° C. for 72 hours. A polymer was thereby formed which was identified as the copolymer of styrene and vinylbenzylglycidyl ether in substantially the ratio employed in the reaction mixture. The polymer so formed was dissolved in 50 milliliters of toluene. By subsequently titrating a sample of the toluene solution, the copolymer therein was shown to consist of 4.2% oxirane groups.

*Example 3*

The toluene solution of the polymer of Example 2 was divided into two equal sized portions. The stoichiometric quantity, required to react with the oxirane groups present, of the following hardening agents, in the amount set forth below, were added to each portion:

| Milliliters of Polymer Solution | Hardening Agent Used | |
|---|---|---|
| | Type | Amount in Grams |
| 6.85 | phthalic anhydride | 0.2236 |
| 7.6 | dicyandiamide | 0.1406 |

The gelation characteristics of the polymer solutions containing the hardening agents, as above described, were ascertained by placing samples thereof in a furnace at 100° C. for 50 minutes, then raising the temperature of the furnace to 150° C., and maintaining this temperature for six hours; they were thereafter removed and inspected. Each of the polymer samples containing each of the hardening agents was either gelled or markedly thickened indicating a near-gelled condition. The gelation test is an accepted test for polymeric materials containing hardening agents for investigating the curing characteristics. The gelation tests showed that the application of higher heat and/or additional curing time would cure the gelled polymeric mixtures to hard durable useful resins. This was further verified by subsequent examination of the gelled resin after an additional period in air. At that time it had cured to a hard resinous solid. Gelation in the instant example was notably slow due to the presence of the toluene solvent. This composition, i.e., the resin dissolved in toluene, is particularly directed to its application as a fluid, relatively thin surface-protective coating which subsequently (and rather rapidly) loses the toluene content and cures to a hard durable film.

Having described my invention, what I claim and desire to protect by Letters Patent is:

1. The compound:

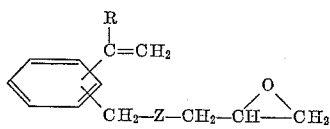

wherein Z is selected from the group consisting of O and S and R is selected from the group consisting of H and alkyl groups containing from 1 to 4 carbon atoms.

2. The compound: 1,2-epoxy-3-(ar-vinylbenzyloxy) propane.

3. The compound: 1,2-epoxy-3-(ar-vinylbenzylthio) propane.

4. The compound: 1,2-epoxy-3-(ar-alkylvinylbenzyloxy) propane wherein the alkyl group contains from 1 to 4 carbon atoms.

5. The compound: 1,2-epoxy-3-(ar-alkylvinylbenzylthio) propane wherein the alkyl groups contain from 1 to 4 carbon atoms.

6. The homopolymer consisting of the compound of claim 1 polymerized through the vinyl groups by subjecting said compound to a temperature of between about 50° C. and 120° C. in the presence of a free radical-promoting agent.

7. The curable epoxy resin consisting of the admixture of the homopolymer of claim 6 and a compound which effects a cure through the oxirane groups of said homopolymer selected from the class consisting of primary and secondary aliphatic and aromatic amines, dicarboxylic acids and anhydrides thereof, phenols, diphenols, and polyphenols, inorganic bases, and Lewis acids and amine and ether complexes thereof.

8. The copolymer consisting of the compound of claim 1 and an ethylenically unsaturated monomer selected from the class consisting of styrene, acrylonitrile, vinyl toluene, acrylic acid, methacrylic acid, lower alkyl-substituted acrylic acids, lower alkyl esters of acrylic acid and of alkyl-substituted acrylic acids and mixtures thereof.

9. The copolymer of claim 8 wherein said ethylenically unsaturated monomer is styrene employed in a weight proportion of between 5 and 95 parts and said compound is employed in a weight proportion of between 95 and 5 parts.

10. The cured resin consisting of the reaction product of the copolymer of claim 8 and (1) a curing agent which effects a cure through the oxirane groups, selected from the class consisting of aliphatic and aromatic primary, secondary, and tertiary amines, dicarboxylic acids and anhydrides thereof, Lewis acids and amines and ether complexes thereof, inorganic bases, phenols, diphenols and polyphenols and (2) a free radical-promoting catalyst which effects copolymerization thru the ethylenic bonds.

11. The cured resin of claim 10 wherein said curing agent which effects a cure through the oxirane groups is phthalic anhydride employed in a molar ratio which provides about the equivalent weight of anhydride groups per equivalent weight of the oxirane groups present in the copolymer.

12. The cured resin consisting of the reaction product of the compound of claim 8 and maleic anhydride employed in substantially the stoichiometric quantity required for reaction with both the vinyl groups and the oxirane groups present in said compound.

13. The cured resin consisting of the reaction product of the compound of claim 1 and an hydroxy compound selected from phenol, diphenols, and polyphenols, in an amount sufficient to provide about one hydroxy group per oxirane group present in said compound in the presence of from about 0.1 to 1.0 percent, by weight of the reaction product, of a tertiary amine, and an ethylenically unsaturated monomer selected from the class consisting of styrene, acrylonitrile, vinyl toluene, acrylic acid, methacrylic acid, lower alkyl-substituted acrylic acid, lower alkyl esters of acrylic acid and of alkyl-substituted acrylic acid, and mixtures thereof in the presence of a free-radical promoting catalyst at a temperature between about 60° and 120° C.

References Cited in the file of this patent
UNITED STATES PATENTS
3,014,890   Bradley et al. _____ Dec. 26, 1961